July 11, 1950
H. HORNSCHUCH
2,515,153
OILING DEVICE FOR BEARINGS
Filed Oct. 23, 1947
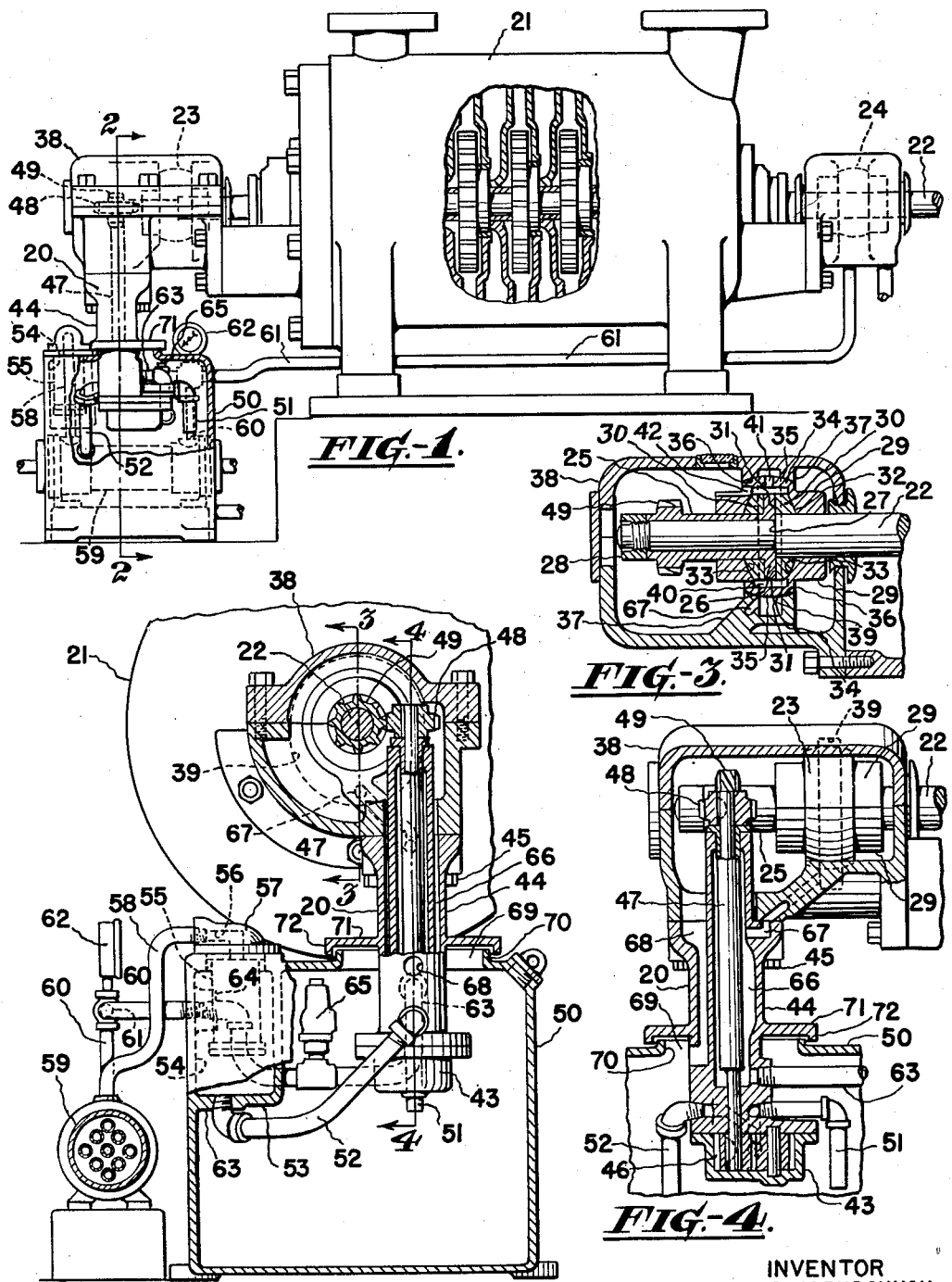
INVENTOR
HANNS HORNSCHUCH.
BY
HIS ATTORNEY Patented July 11, 1950

2,515,153

UNITED STATES PATENT OFFICE 2,515,153

OILING DEVICE FOR BEARINGS

Hanns Hornschuch, Easton, Pa., assignor to Ingersoll-Rand Company, New York, N. Y., a corporation of New Jersey Application October 23, 1947, Serial No. 781,719

3 Claims. (Cl. 184—6)

This invention relates to oiling devices, and more particularly to an oiling device for bearings of the thrust type.

One object of the invention is to reduce to a minimum the number of exposed conduits and joints required for supplying the oil to the bearings.

A further object is to prevent the splattering of oil over objects in the vicinity of the machine to which the oiling device is applied in the event of failure of the oil conveying means and their joints.

Other objects will be in part obvious and in part pointed out hereinafter.

In the drawings accompanying this specification and in which similar reference numerals refer to similar parts, Figure 1 is a side elevation, partly broken away, of an oiling device constructed in accordance with the practice of the invention and a pump to which the oiling device is applied, Figure 2 is a transverse view taken through Figure 1 on the line 2—2, and Figures 3 and 4 are similar views taken through Figure 2 on the lines 3—3 and 4—4, respectively.

Referring more particularly to the drawings, 20 designates, in general, an oiling device constructed in accordance with the practice of the invention and 21 a centrifugal pump having a shaft 22 and bearings 23 and 24 therefor to which the oiling device 20 supplied oil under pressure for lubricating them.

On the shaft 22 is a sleeve 25 that carries a thrust collar 26 and seats at one end against a shoulder 27 on the shaft. The sleeve may be secured against rotation with respect to the shaft in any well known manner and is pressed against the shoulder 27 by a nut 28. Within the blocks 29 supporting the shaft 22 are thrust shoes 30 to engage, at their inner surfaces 31, the end surfaces of the flange 26. The outer surfaces 32 of the shoes 30 are of spherical shape and seat against correspondingly shaped surfaces 33 on the blocks 29 to enable said thrust shoes to adjust themselves readily with respect to the flange 26 and the blocks 29. The blocks 29 have external flanges 34 the peripheral surfaces 35 of which are of spherical shape and seat upon similarly shaped surfaces 36 of webs 37 within the casing or bearing housing 38 housing the bearing 23.

The opposed inner surfaces of the webs 37 are recessed to form an annular groove 39 that encircles the flanges 34 and communicates with an annular groove 40 within the blocks 29 through an aperture 41 in the top portion of the upper block 29. The annular groove 40 encircles the thrust collar 26 and the thrust shoes 30 so that the cooperating surfaces of these parts will be immersed in oil both when the pump is in operation and idle. The groove 40 will at all times be full of oil so that an ample supply thereof will be available for lubricating the thrust surfaces at the beginning of each starting period of the pump. The oil entering the annular groove 40, in excess of that required for filling said groove will pass from the upper part thereof into the casing or housing 38 through a channel 42 in the upper block 29.

The oiling device 20, constructed in accordance with the practice of the invention, is arranged adjacent the bearing 23. It comprises a pump 43, of the gear type, that is attached to the lower end of a distance piece or pump casing 44 depending from and secured to the casing or housing 38 by bolts 45. The pump 43 is driven by the shaft 22, its driving gear 46 being keyed to a vertical shaft 47 that has a pinion 48 meshing with a gear 49 on the shaft 22.

The pump 43 is held suspended in the intermediate portion of a reservoir 50 by the distance piece 44 and its suction pipe 51 is preferably of short length to prevent the drawing of sediment from the bottom of the resrvoir into the pump. The discharge conduit 52 for the pump also lies entirely within the reservoir 50 and is connected to the wall 53 of a compartment 54 containing a filter 55 that filters the oil prior to its delivery to the bearings.

The filter 55 may be of any suitable type and the oil passes therefrom into a passage 56 in a cover plate 57 for the compartment 54. A conduit 58 connected to the cover plate 57 conveys the oil from the passage 56 to a cooler 59 shown arranged immediately adjacent the side of the reservoir 50 in order that the conduit 58 may be held to a short length. The oil passes from the cooler 59 through a discharge conduit 60 having a branch conduit 61 leading to the bearing 24 and a gauge 62 for indicating the pressure of the oil. The conduit 60 is connected to the reservoir 50 and opens into a conduit 63 connected to a boss 64 on the inner surface of the reservoir at one end and at its other end to the distance piece or pump casing 44 at a point inside of the reservoir 50.

The conduit 63 is provided with a relief valve 65 and opens into a cavity 66 in the distance piece containing the shaft 47. A passage 67 in the distance piece and in the casing 38 conveys the oil from the cavity 66 to the annular groove 39, and the oil discharged into the casing 38 by the channel 42 passes from the casing 38 to the reservoir through a passage 68, in the casing 38 and the distance piece 44, opening into the upper portion of the reservoir 50.

The opening 69 in the reservoir wherein the distance piece or pump casing 44 lies and through which the pump 43 is placed into the reservoir is defined by an annular flange 70 and is covered by a cover 71 which has a depending flange 72 that encircles the flange 70 to prevent the entrance of foreign matter into the reservoir. The cover 71 and the flange 72 are spaced a suitable distance from the flange 70 to prevent the application of thrust from the distance piece to the reservoir whenever the pump contracts or expands.

In practice, the present invention has been found to be highly desirable for use for the purpose set forth. By arranging the pump within the reservoir and conveying the oil to and from the bearing through passages within the distance piece and by arranging the parts in such wise that most of the joints of the conduits conveying the oil may be made within the reservoir. The chances of smearing oil upon the floor and objects in the vicinity of the pump will be greatly minimized as will also be the chances of injuring or breaking the conduits. The parts comprising the oiling device are, moreover, grouped in a more compact arrangement than in devices wherein the conduits and parts associated therewith lie exteriorly of the reservoir.

I claim:

1. In an oiling device, a casing, a shaft in the casing, a bearing in the casing for the shaft, a reservoir for oil detached from the casing and having an opening, a pump in the reservoir for pumping oil to the bearing, means depending from the casing and extending through the opening for holding the pump suspended in the reservoir and having passages for conveying the oil discharged by the pump to the bearing and for returning such oil to the reservoir, and a cover on the said means for the opening arranged in non-contacting relation with the reservoir to prevent the transmission of thrust from the casing to the reservoir.

2. In an oiling device, a casing, a shaft in the casing, a bearing in the casing for the shaft, a reservoir for oil, a pump in the reservoir for pumping oil to the bearing, a distance piece on the casing to support the pump having a passage to convey oil discharged by the pump to the bearing and second passage for the return flow of such oil to the reservoir, and means in the reservoir to filter the oil flowing from the pump to the first mentioned passage.

3. In an oiling device, a shaft, a bearing for the shaft, a housing for the bearing, a reservoir for oil, and a pump casing depending from the bearing housing into the reservoir and having therein a pump for pumping oil from the reservoir and passageways in the casing wall for conveying such oil to and from the bearing.

HANNS HORNSCHUCH.

REFERENCES CITED

The following references are of record in the file of this patent:

UNITED STATES PATENTS

| Number | Name | Date |
| --- | --- | --- |
| 1,284,701 | Jungren | Nov. 12, 1918 |
| 1,607,318 | Spillman | Nov. 16, 1926 |
| 1,686,839 | Rhoads | Oct. 9, 1928 |
| 2,124,395 | Caughey | July 19, 1938 |
| 2,355,217 | Hamann | Aug. 8, 1944 |